March 24, 1959     H. H. CARY ET AL     2,879,393
WIDE-RANGE SPECTROPHOTOMETER
Filed Dec. 27, 1954     3 Sheets-Sheet 3

HENRY H. CARY,
ROLAND C. HAWES,
INVENTORS.

BY Reed Lawlor
ATTORNEY.

United States Patent Office 2,879,393
Patented Mar. 24, 1959

2,879,393

WIDE-RANGE SPECTROPHOTOMETER

Henry H. Cary, Alhambra, and Roland C. Hawes, Monrovia, Calif., assignors to Applied Physics Corporation, Monrovia, Calif., a corporation of California Application December 27, 1954, Serial No. 477,831

12 Claims. (Cl. 250—43.5)

This invention relates to spectrophotometry, and more particularly to improvements in spectrophotometers of the flicker-beam type which facilitate the application of such spectrophotometers to the analysis of samples over a wide range of wavelengths, extending from the ultraviolet region to the infrared region. Although the invention is applicable to other types of spectrophotometry, even including reflection spectrophotometry, for simplicity it is discussed and described herein with particular reference to absorption spectrophotometry.

In flicker-beam spectrophotometry, radiation from a source is alternately transmitted along two separate branch paths to a photoelectric device, the alternation being accomplished by the periodic deflection of the radiation by means of a beam director. A sample to be analyzed is placed in one of the branch paths and a reference sample, if one is to be employed, is placed on the other branch path. Only a part of the radiation entering a sample is transmitted to the photoelectric device. A monochromator is employed between the radiation source and the photoelectric device in order that the transmission coefficient or absorption coefficient of the sample may be measured at different wavelengths. The beam director itself that is employed in a flicker-beam spectrophotometer generally includes a segmental mirror that is rotated by an electric motor in such a way as to cause the radiation to be alternately transmitted along the two paths.

One source of error in such a spectrophotometer arises from the fact that different amounts of black-body radiation are transmitted to the photo-electric device at different times during the operation of the beam director. This black-body radiation consititutes a variable background that is superposed upon the monochromatic radiation that is to be transmitted to the photoelectric device. This difficulty arises partly from the fact that different parts of the spectrophotometer that have different temperatures are visible from the position of the photoelectric device depending upon whether the mirror is inactive to permit radiation to be transmitted along one path or whether the mirror is active to intercept radiation being transmitted along that path to deflect it to the other path. This difficulty also arises partly from the fact that even when the same parts are visible from the photoelectric device along both paths the spectral characteristics of the optical parts that are disposed along the two paths differ.

By way of illustration, consider the effect of the fact that the temperature of the rotating mirror itself is generally about ½° to about 1½° or even more above the ambient temperature prevailing throughout the spectrophotometer. Because of the fact that the rotating mirror is heated, each time that the mirror is interposed in the paths, an excess of infrared radiation is transmitted along the paths both toward the photoelectric device and also toward the radiation source. Part of this radiation is emitted by the reflecting or front surface of the mirror and part from the back surface. As a result, even though the excess temperature differential of the mirror is small, spurious indications may be produced which interfere with the accuracy of the measurements of the radiation coefficients of the sample.

Another source of difficulty lies in the fact that any ultraviolet radiation incident on the sample is liable to cause the sample to deteriorate because of photochemical action. This is especially true in absorption spectrophotometry.

According to this invention a flicker-beam spectrophotometer is provided in which short-wavelength radiation including ultraviolet radiation is first transmitted through the monochromator prior to passage through the sample to a first photoelectric device, and in which infrared radiation is first passed through the sample prior to transmission through the monochromator to a second photoelectric device. Thus, short-wavelength radiation is transmitted through the system in one direction and long-wavelength radiation is transmitted therethrough in the opposite direction. More particularly, in accordance with this invention, a short-wavelength photoelectric device and an infrared radiation source are selectively positioned at one end of the system where the two branch paths converge so as to facilitate detection of ultraviolet radiation at such position after passage through the sample and so as to facilitate transmission of infrared radiation from that position through the sample in the opposite direction. Also in accordance with this invention short-wavelength radiation is transmitted through the monochromator in one direction to that position, and long-wavelength radiation emerging from the monochromator in the opposite direction is detected without interference from long-wavelength radiation emitted from the short-wavelength source. Also, in accordance with this invention, a master control device energizes the short-wavelength photoelectric detector only when the infrared source is not energized. This master control also renders the infrared detector operative only when the infrared source is energized. This control device also acts to prevent any scattered radiation emitted from the short-wavelength source from reaching the infrared detector at such a time that this detector is in use for detecting infrared radiation emerging from the monochromator.

The invention, together with many of its features and advantages, will best be understood from the following detailed description taken in connection with the accompanying drawing wherein.

Figure 1:
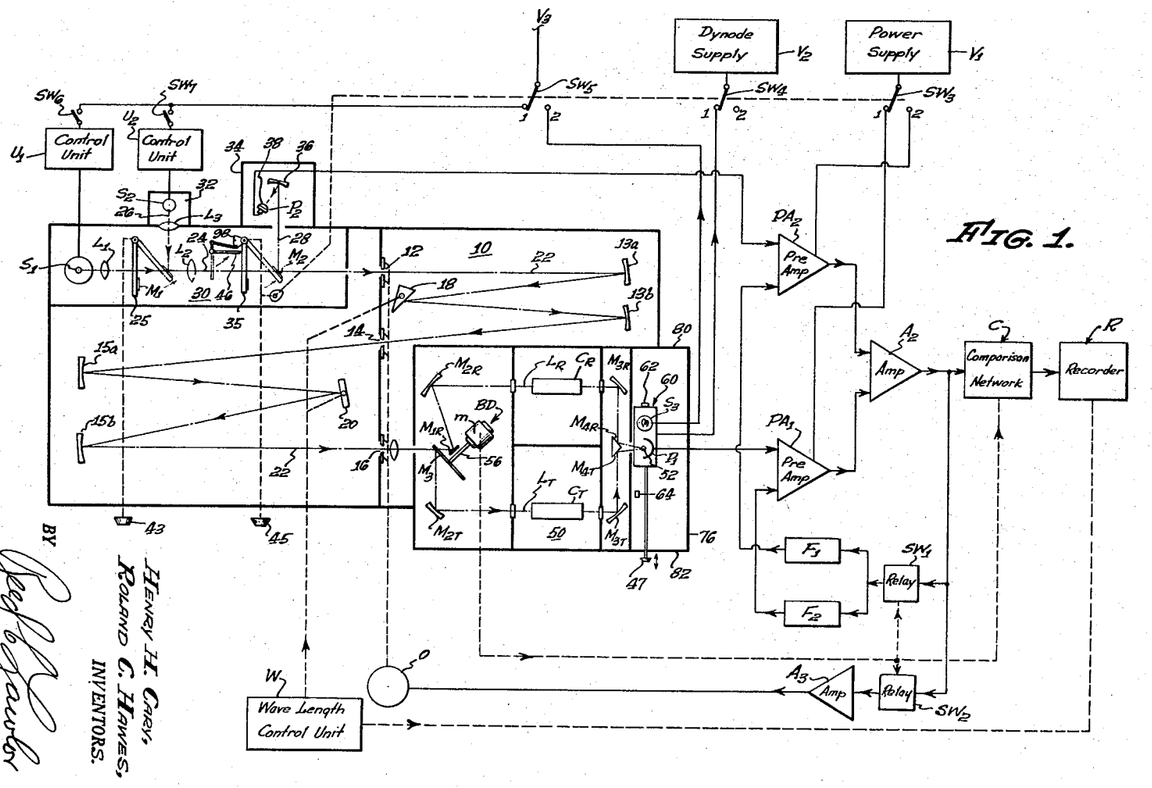
Figure 1 is a schematic diagram of a flicker-beam spectrophotometer embodying the invention.

The flicker-beam spectrophotometer embodying the present invention and illustrated schematically in Fig. 1 comprises a monochromator 10, a selector unit 30, and a comparison unit 50, together with power supplies and controls and measuring circuits, as described more particularly hereinafter.

The monochromator 10, which is of the type which is described and claimed in co-pending patent application Serial No. 477,793 comprises jaws that define terminal slits 12 and 16 at opposite ends thereof and an intermediate slit 14 between the ends thereof. A prism 18 between one terminal slit 12 and the intermediate slit 14 and a diffraction grating 20 between the intermediate slit 14 and the other terminal slit 16 cooperate to cause heterogeneous radiation entering one of the terminal slits to be separated spectrally so that monochromatic radiation in a narrow wavelength band emerges from the terminal slit at the other end of the monochromator. Thus when heterogeneous radiation, such as "white" light, including ultraviolet and infrared, as well as visible radiation, enters one of the terminal slits of the monochromator, a fraction of that radiation in a narrow wavelength band emerges from the other terminal slit. For example, when light enters slit 12 some of it lying in a narrow wavelength band travels along light path 22 to concave mirror 13a, prism 18, concave mirror 13b, thence through slit 14 to concave mirror 15a, diffraction grating 20, concave mirror 15b, and then emerges through the other slit 16 as monochromatic radiation. Also, when light enters slit 16 it travels along the same light path 22 to the other slit 12 from which it emerges as monochromatic radiation. The wavelength of the emerging radiation depends on the setting of the prism 18 and the diffraction grating 20, irrespective of the direction of travel on the light path 22. A wavelength control unit W is employed to rotate the prism 18 and the diffraction grating 20 in synchronism, as described in said co-pending patent application, so that the monochromator operates to vary the wavelength of the emerging monochromatic radiation over a wide range extending from about $0.2\mu$ to about $3.0\mu$.

A compound short-wavelength source comprising two parts, namely, a hydrogen lamp $S_1$ and an incandescent lamp $S_2$ are arranged in the selector unit 30. The hydrogen lamp $S_1$ is mounted on a rectilinear, or straight-line, external light path 24 that is collinear with the light path 22 extending outwardly through the terminal slit 12. A pair of lenses $L_1$ and $L_2$ mounted on the light path 24 is employed to focus radiation from the hydrogen lamp $S_1$ onto the terminal slit 12. The hydrogen lamp $S_1$ is of a type that produces a continuous ultraviolet spectrum and is paraticularly adapted for use in this spectrophotometer over a range from about $0.2\mu$ to about $0.35\mu$. The spectrum of such a lamp is represented by graph $G_1$ of Fig. 4. It is to be noted that radiation is transmitted from the hydrogen lamp $S_1$ to the slit 12 along a straight axis 24 without reflection other than that which produces reflection losses at the surfaces of the lenses $L_1$ and $L_2$. By avoiding the use of reflecting surfaces to project radiation from the hydrogen lamp $S_1$ to the slit 12, high losses of short-wavelength energy are avoided. For maximum efficiency the central arc of the hydrogen lamp is arranged to face the slit 12. A 75-watt hydrogen lamp has been found to be satisfactory.

The incandescent lamp $S_2$ is mounted in a side section or compartment 32 of the selector unit 30. Such a lamp generally consists of a tungsten filament operated at a temperature of about 2600° K., so that the lamp produces radiation which is very weak in the ultraviolet region, which is relatively strong in the visible region, and which is very strong in the infrared region. The spectrum of such a lamp is represented by graph $G_2$ of Fig. 4. A 30-watt incandescent lamp has been found to be satisfactory. In this spectrophotometer the incandescent lamp $S_2$ is employed particularly in a part of the visible region from about $0.35\mu$ to about $0.6\mu$. A control knob 43 mounted at the front of the spectrophotometer is employed to swing a mirror $M_1$ into a position where it intersects the axis 24 at an angle of 45° at a point between the lenses $L_1$ and $L_2$, thereby providing an alternate path extension 26 at right angles to the external path 24. The incandescent lamp source $S_2$ is located on the alternate extension 26 and a lens $L_3$ is employed in conjunction with the lens $L_2$ to focus radiation from the incandescent lamp source $S_2$ onto the slit 12. As shown more clearly in Fig. 3, the filament of the incandescent lamp $S_2$ is arranged parallel to the length of the slit 12 so that the slit may be illuminated evenly along its length.

The selector unit 30 is also provided with a second side section on compartment 34, in which there is mounted a photoelectric detector $P_2$ which is especially sensitive in the long-wavelength region from say about $0.6\mu$ to about $3.0\mu$. The photoelectric detector $P_2$ may be in the form of a lead sulphide cell. Such a cell generally employs a very small photo-sensitive surface, such as one which is about 0.125″ in length and about 0.020″ in width. The spectral sensitivity of such a photoelectric device is represented by graph $G_5$ of Fig. 5.

A control knob 45 at the front of the spectrophotometer is employed to swing a mirror $M_2$ into a position where it intercepts the light path 24 between the lens $L_2$ and the terminal slit 12, thus producing an auxiliary path extension 28 along which any infrared radiation emerging from the terminal slit 12 may be projected into the section 34, where it is focused by means of a concave mirror 36 and an aplanatic lens 38 onto the photosensitive surface of the lead sulphide cell $P_2$.

The comparison unit 50 is of the type described and claimed in co-pending patent application Serial No. 411,650 filed by Henry H. Cary on February 23, 1954. In this test unit, toric mirrors are employed to transmit radiation along two light paths between the terminal slit 16 and a vertical line at a focal position 52. A beam director BD is employed to alternately transmit radiation between the position of the slit 16 and the conjugate position 52 along a reference sample path $L_R$ and along a test sample path $L_T$.

Consider for a moment the case in which monochromatic radiation is emerging from the exit slit 16 and entering the comparison unit 50. Monochromatic radiation from the monochromator is projected toward the beam deflector BD, where it is periodically intercepted by a rotating segmental mirror $M_3$. When so intercepted the emergent monochromatic radiation is reflected by the toric mirror $M_{2T}$ through a test cell $C_T$ containing a sample undergoing analysis and then by a toric mirror $M_{3T}$ to a toric mirror $M_{4T}$ and thence to the position 52, sometimes referred to herein as a focal position. During the intervals when the rotating sector mirror $M_3$ does not intercept the path 22 the emergent monochromatic radiation is reflected by a plain mirror $M_{1R}$ to a toric mirror $M_{2R}$, and thence through a reference cell $C_R$ containing air or some other reference sample. The radiation transmitted through the cell $C_R$ is then reflected by the toric mirror $M_{3R}$ to the toric mirror $M_{4R}$ and thence to the focal position 52. As explained in said co-pending application, Serial No. 411,650, the radiation emerging from the terminal slit 16 may be concentrated on a vertical strip at the position 52, whether the radiation is transmitted along the reference path $L_R$ or along the test path $L_T$. Conversely, if a line source of radiation is located along a vertical line at position 52, radiation therefrom may be concentrated on the slit 16 along either the reference path $L_R$ or along the test path $L_T$. Viewed in a horizontal plane, an aperture stop (not shown) located in front of the diffraction grating 20 is imaged at position 52, while viewed in a vertical plane the terminal slit 16 is imaged very near the position 52. In this way, the intensity of radiation transmitted through the slit varies with the slit width without being affected by spatial irregularities of either a source or a detector located at the position 52.

In the present invention, radiation emerging from either the position of the terminal slit 16 or the position 52 is transmitted to the other position alternately along either of the paths $L_R$ or $L_T$ which are in effect branches of an extension of the light path 22 of the monochromator 10. It is to be noted that the two light paths $L_R$ and $L_T$ coincide at the terminal slit 16 but that they converge at a small acute angle on the position 52, merging, however, in a narrow vertical region or image area along a common line at that position.

The beam deflector BD includes an electric motor $m$ for driving a shaft 56 upon which the mirror $M_3$ is mounted. Some of the heat dissipated in the motor $m$ is transmitted along the shaft 56 to the mirror $M_3$. As a result, the temperature of the mirror $M_3$ lies somewhat above the ambient temperature. For this reason each time that the mirror $M_3$ intercepts the light path 22, an excess of infrared radiation is transmitted to the position 52. Such infrared radiation is intermittently transmitted to the position 52 from the reflecting surface of the mirror $M_3$ along the test path $L_T$. Such radiation is also intermittently transmitted from the back of the mirror to the position 52 along the reference path $L_R$. At the same time infrared radiation emitted from the reflecting surface of the mirror $M_3$ is transmitted toward the terminal slit 16, where it enters the monochromator 10. In practice, as explained in copending patent application Serial No. 411,650, a chopper disk may be mounted on the shaft 56 to limit the periods of transmission of monochromatic radiation to alternate quarter-cycles of the rotation. Such a chopper disk would also be heated and would emit infrared radiation along the same paths as the mirror $M_3$.

Furthermore, different parts of the spectrophotometer other than the mirror $M_3$ and which have different temperatures may be visible from position 52 according to whether or not the mirror is active so as to reflect radiation along the test sample path $L_T$ or inactive so as to transmit radiation along the reference sample path $L_R$. For example, when the mirror $M_3$ is inactive the photoelectric detector $P_1$ located at position 52 can "see" the upper portion of the wall 80 because radiation from that wall is reflected by the mirror $M_{2T}$ along the test path $L_T$. But when the mirror $M_3$ is inactive this part of the wall cannot be seen by the photoelectric detector $P_1$. Furthermore, when the mirror $M_3$ is inactive the photoelectric device "sees" parts of the monochromator which emit radiation which is transmitted along the path 22 to the mirror $M_{1R}$ and along the reference sample path $L_R$. More particularly, radiation other than the desired monochromatic radiation seen along this path includes radiation emitted from the jaws forming the slits 12, 14 and 16 and radiation emitted from the mirrors 15a and 15b and the diffraction grating 20 and from the mirrors 13a and 13b and the prism 18. When the mirror $M_3$ is active, the various parts of the monochromator and the front face of the mirror $M_3$ also are seen by the photoelectric device but along the path $L_T$, whereas the back face of the mirror $M_3$ is seen by the photoelectric detector $P_1$ along the path $L_R$. Although radiation is transmitted from the monochromator both along the reference sample path $L_R$ and along the test sample path $L_T$, the amounts of infrared radiation reaching the photoelectric device $P_1$ by those two paths may differ somewhat because of slight differences in the reflection and transmission coefficients of the various parts, such as cells $C_R$ and $C_T$ or mirrors $M_{2R}$, $M_{2T}$, $M_{3R}$ and $M_{3T}$ located along those paths, and even because of differences in the characteristics of the samples in the cells $C_R$ and $C_T$.

It is thus clear that the amount of infrared radiation received at position 52 varies during the rotation of the mirror $M_3$. Such variations that may be due to the temperatures of the stationary parts of the monochromator and of the compartment that houses the comparator 50 may be reduced greatly by controlling their temperature. However, it is very difficult to maintain the temperature of the mirror $M_3$ or any beam chopper or other parts associated therewith the same as the temperature of the walls. Accordingly, although the invention is applicable to a spectrophotometer in which parts other than the beam deflector produce fluctuations in the amount of infrared radiation reaching the photoelectric detector during the operation of the beam deflector, for simplicity the invention is described specifically hereinbelow with reference to the temperature effects caused by a rotating heated mirror. Furthermore, although the invention is also applicable to a beam deflector that includes a beam chopper and other parts, the invention is described hereinbelow without specific reference to such a beam chopper.

Figure 5:
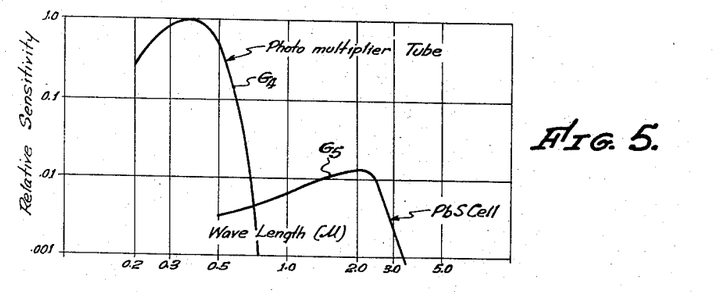
Fig. 5 is a graph of the spectral response characteristics of the photoelectric devices.

The temperature of the mirror $M_3$ may be only about ½° C. to about 1½° C. above the ambient temperature. A curve representing the difference between the spectrum of black-body radiation at 21.0° C. and the black-body spectrum at an ambient temperature of 20.0° C. throughout the entire spherical angle about the black body, is represented in graph $G_6$ of Fig. 6. Integrating this graph and taking into account the emission characteristics of the front and back surfaces of the mirror, the small solid angle over which radiation is transmitted from the mirror to the focal position 52, and other factors, it is found that the excess energy emitted by the mirror and periodically reaching the focal position 52 is of about the same order as the amount of monochromatic energy that reaches that position after emerging from the terminal slit 16. Even when the total excess energy is only 1% of the monochromatic energy, serious errors can occur. Such excess energy has little effect on the output of the photo-multiplier tube because this tube, as indicated by graph $G_4$, is very insensitive above about $0.6\mu$.

Figure 6:
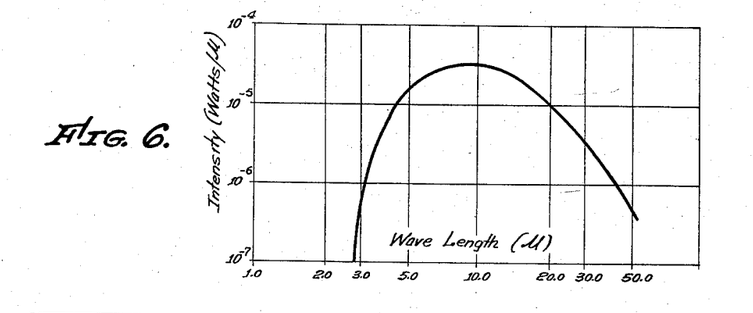
Fig. 6 is a graph of excess black-body radiation introduced by a beam director.

However, the sensitivity of the PbS cell $P_2$ is high between about $0.6\mu$ and about $3.0\mu$, though it falls off rapidly above about $2.6\mu$. A comparison of graph $G_6$ with the graph $G_5$ discloses that even at wavelengths in a region above about $2.6\mu$ the intensity of excess radiation per unit wavelength increases more rapidly than the sensitivity of the PbS photoelectric detector $P_2$ decreases. Even though the sensitivity of such a photoelectric device falls off rapidly above about $2.6\mu$, nevertheless the integrated effect of excess radiation in the ambient infrared range between about $2.6\mu$ to about $4.0\mu$ exceeds the total effect of monochromatic radiation emerging from the monochromator. It is for this reason that excess ambient infrared radiation from the mirror $M_3$, even though very weak, would produce substantial spurious effects that would mask the desired signals if the PbS photoelectric detector were located at the focal position 52 instead of at the opposite end of the monochromator as in this invention.

It is to be noted that the excess ambient infrared radiation that is especially disturbing is not that near the peak of graph $G_6$, but it is that which lies on the short-wavelength side of the graph $G_6$ and is particularly the ambient infrared radiation that lies in the wavelength range in which the graph $G_6$ is very steep and above the wavelength at which the sensitivity of the lead sulphide cell begins to diminish rapidly.

In this invention, suitable means are provided for selectively positioning a short-wavelength photoelectric detector $P_2$ and a long-wavelength radiation source $S_3$ at the focal position 52. In the embodiment of the invention specifically illustrated herein the photoelectric detector $P_1$ and the long-wavelength radiation source $S_3$ are mounted upon a carriage 60 which may be moved between a back stop 62 and a front stop 64 to position one or the other of these elements at the focal position 52. To measure the absorption or transmission characteristics of a sample in the short-wavelength region, the carriage is moved to its rearward position by means of a control knob 47 at the front of the instrument panel. In order to measure long-wavelength absorption or transmission characteristics of a sample, the carriage is drawn forward by means of the knob 47 to a position in which it engages the front stop 64. In the former position the photoelectric detector $P_1$ is located so as to detect short-wavelength radiation transmitted from the selector unit 30 through the monochromator 10, and thence through the comparison unit 50. When in the latter position the long-wavelength source $S_3$ is located to transmit light through the comparison unit 50 and then through the monochromator 10, and thence to the long-wavelength detector $P_2$.

The photoelectric detector $P_1$ used at position 52 may be in the form of a type 1P28 photoelectric device employing an S5 photosensitive surface and in which an electron multiplier is employed to amplify the photoelectric output of the surface. The spectral sensitivity of such a photoelectric device is represented by graph $G_4$ of Fig. 5.

The long-wavelength source $S_3$ is in the form of an incandescent lamp operated with its filament at a temperature of about 2800° K. A 100-watt lamp has been found to be satisfactory. As indicated by the graph $G_2$ of Fig. 4, source $S_3$ is rich in infrared radiation. If such radiation were to fall directly on the detector $P_1$ it would disturb both the sensitivity and drift of this detector even though the sensitivity of the detector to infrared radiation is low. This disturbance is produced because the intensity of the source $S_3$ is so great. To eliminate this difficulty the short-wavelength detector $P_1$ is energized only when the long-wavelength source $S_3$ is not energized.

In operation, the short-wavelength source $S_1$ and $S_2$ and the short-wavelength detector $P_1$ are employed to measure characteristics of a sample in the short-wavelength range and the long-wavelength source and the long-wavelength detector $P_2$ are employed to measure characteristics of a sample in the long-wavelength range.

To measure a transmission coefficient of a sample with the spectrophotometer illustrated herein, the output of either detector $P_1$ or $P_2$ is applied to the input of a corresponding preamplifier $PA_1$ or $PA_2$, respectively, as the case may be. Though not so indicated in Fig. 1, the preamplifier $PA_1$ is located on the carriage 60 adjacent the photoelectric detector $P_1$ from which it derives signals, and the preamplifier $PA_2$ is located in the auxiliary compartment 34 adjacent the lead sulphide cell $P_2$ from which it derives signals. As more fully explained hereinafter, only one of the photoelectric detectors $P_1$ or $P_2$ operates at a time and only the corresponding preamplifier $PA_1$ or $PA_2$ is energized at that time.

In any event, the output of the preamplifier $PA_1$ or $PA_2$, as the case may be, is amplified by a driver amplifier $A_2$. The output of the driver amplifier is impressed upon a comparison network C in which the amplitude of a set of reference signals produced at the photoelectric detector $P_1$ or $P_2$ by passage of radiation through a test sample is compared with the amplitude of a set of test signals produced at the same detector after passage through a reference sample. The output of the comparison network is employed to drive a pen of a recorder R. The paper employed in the recorder R is driven by the wavelength control unit W so that the resultant record represents a spectrogram in which the transmission or absorption coefficients, as the case may be, are plotted as ordinates as a function of wavelength as abscissa. The reliability and accuracy of measurements made in a system connected to a single photoelectric detector is increased by periodically operating the comparison network C to sample the two sets of signals, and also by feeding back the output of the driver amplifier $A_2$ to the input of the preamplifier periodically in a certain way that is described and explained in more detail in co-pending patent application, Serial No. 411,794, filed February 23, 1954, by Henry H. Cary and Roland C. Hawes. In the embodiment of the present invention, specifically illustrated in Fig. 1, separate feedback circuits $F_1$ and $F_2$ are employed to feed back signals from the output of the driver amplifier $A_2$ to the input of the corresponding preamplifier $PA_1$ or $PA_2$, respectively, and a common relay $SW_1$ is employed between the output of the driver amplifier $A_2$ and the inputs of the respective feedback filters $F_1$ and $F_2$. In this invention both the relay $SW_1$ in the feedback paths and the relays (not shown) which are included in the comparison network C are driven in synchronism with the operation of the beam director BD by means of the electric motor $m$.

A servo-mechanism is employed to regulate the amplitude of the set of reference signals. This servo-mechanism includes a relay $SW_2$ which supplies signals to an amplifier $A_3$ which operates a motor 0 that automatically adjusts the width of the slits 12, 14 and 16 to produce the desired regulation. Relay $SW_2$ is operated by shutter motor $m$ to close only while reference signals are being detected and amplified. The arrangement is such that if the amplitude of the reference signal increases the widths of the slits decrease, and conversely, if the amplitude of the reference signal decreases the widths of the slits increase. In practice, the widths of slits 12 and 16 are thus automatically varied over a range from about 0.005 mm. to about 3.0 mm. The width of the intermediate slit 14 also varies, but it is so wide that it does not affect the intensity greatly.

Figure 7:
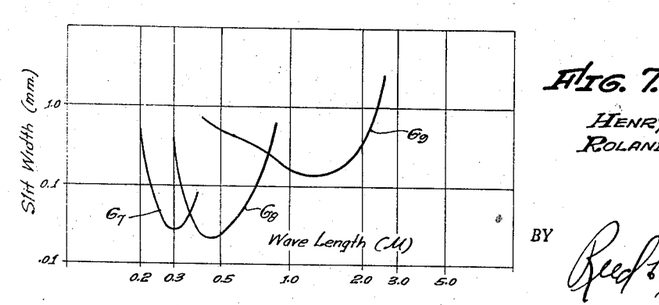
Fig. 7 is a graph showing how the widths of the slits are varied automatically with wavelength.

In Fig. 7, graphs $G_7$, $G_8$, and $G_9$ represent the manner in which the widths of slits 12 and 16 vary with wavelength when only one of the sources $S_1$, $S_2$ or $S_3$, respectively, are operating. In this specific case it will be noted that graphs $G_7$ and $G_8$ overlap at about $0.35\mu$, and that graphs $G_8$ and $G_9$ overlap at about $0.75\mu$. These points of overlap then serve as convenient points at which to switch the operation of the spectrophotometer from one source to another.

Figure 4:
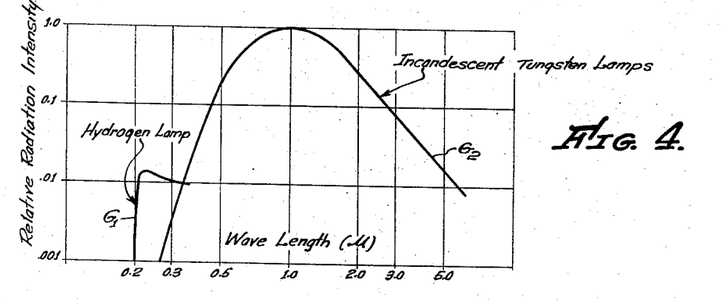
Fig. 4 is a graph of the emission spectra of the sources.

In practice, then, the switchover from lamp $S_1$ to lamp $S_2$ is made below about $0.35\mu$ because the slit width requires no change at $0.35\mu$, but also because the emission curve $G_1$ of the hydrogen lamp is erratic above about $0.35\mu$. But, in practice, the switchover from lamp $S_2$ to lamp $S_1$ is made at about $0.6\mu$ instead of at about $0.75\mu$ because the characteristics of photo-multiplier tubes, such as 1P28's, vary greatly from one specimen to another above about $0.6\mu$.

The two preamplifiers $PA_1$ and $PA_2$ are supplied power from a common power supply $V_1$, a switch $SW_3$ being employed to connect the output of the power supply $V_1$ to either the preamplifier $PA_1$ or the preamplifier $PA_2$, according to whether the switch is in position 1 or position 2. An auxiliary high voltage supply $V_2$, known as a dynode supply, is adapted to supply power to the photoelectric detector $P_1$ when a switch $SW_4$ is in position 1. Alternating current from house mains $V_3$ may be applied to the short-wavelength source $S_1$, $S_2$ through a switch $SW_5$ when this switch is in position 1, or to the long-wavelength source $S_3$ when it is in position 2. The three switches $SW_3$, $SW_4$ and $SW_5$ are ganged and are operated by means of the master control knob 45 in synchronism with the movement of the mirror $M_2$ so that the switches are in position 1 when the mirror $M_2$ is withdrawn from the light path 24 and so that they are in position 2 when the mirror $M_2$ intercepts the light path 24. Thus, the knob is set in one position to render the apparatus operative for making measurements in the short-wavelength range and in a second position to render the apparatus operative for making measurements in the long-wavelength range.

When the master control knob 45 is in the short-wavelength position, the carriage 60 is set by means of the knob 47 in its rearward position so that the photoelectric detector $P_1$ which is now energized from the dynode supply $V_2$ will be located at the focal position 52, where it may detect radiation transmitted from the selector unit 30 through the monochromator 10 and through the comparison unit 50.

When the master control knob 45 is turned to its long-wavelength position, the carriage 60 is drawn to its forward position by means of the control knob 47 so that the long-wavelength source $S_3$ is located at position 52 in order that long-wavelength radiation shall pass through the test unit 50 and thence through the monochromator 10, and thence by reflection from the mirror $M_2$ to the long-wavelength photoelectric detector $P_1$.

It will be noted that when the spectrophotometer is so arranged, radiation from either lamp $S_1$ or $S_2$ passing through the monochromator is detected by the photoelectric detector $P_1$ and that the resultant signals are amplified by the preamplifier $PA_1$ and the driver amplifier $A_2$. When the control knob 43 is in its short-wavelength position radiation from the hydrogen lamp $S_1$ may be employed in the analysis. The hydrogen lamp itself is energized by closing a manually operated switch $SW_6$ to apply alternating current from the house mains $V_3$ to a suitable control unit $U_1$ which supplies power in a conventional way to the hydrogen lamp. Similarly, alternating current from the power mains $V_3$ may be applied by closing a manually operated switch $SW_7$ to a control unit $U_2$ which supplies power to the incandescent lamp $S_2$. Normally only one of these manually operated switches $SW_6$ or $SW_7$ is closed at a time, although satisfactory operation is attainable if both are closed simultaneously.

In order to measure the transmission or absorption spectrum of a test sample with this spectrophotometer, a test cell $C_T$ including the test sample and a suitable reference sample contained within the reference cell $C_R$ are placed within the comparison unit 50 at suitable positions on the test path $L_T$ and the reference path $L_R$, and three spectrograms are recorded successively in overlapping ranges extending from about $0.2\mu$ to about $0.35\mu$, and a second range from about $0.35\mu$ to about $0.6\mu$ and in a third range from about $0.6\mu$ to about $3.0\mu$. To record spectrograms in the short-wavelength range from about $0.2\mu$ to about $0.6\mu$ the control knobs 45 and 47 are both set in their short-wavelength positions. It is to be noted that with the spectrophotometer operating in this condition the short-wavelength photoelectric cell $P_1$ is located at the focal position 52 and it is energized by voltage from the dynode supply $V_2$, and that the preamplifier $PA_1$ is energized from the power supply $V_1$. At the same time power is supplied from the house mains $V_3$ to the circuits which supply power to either of the short-wavelength sources $S_1$ or $S_2$.

Then switch $SW_6$ is closed, causing the hydrogen lamp $S_1$ to be energized. When the hydrogen lamp $S_1$ is energized the mirror $M_1$ is set in its off-axis position, so that radiation from the hydrogen lamp enters the monochromator 10. While the spectrophotometer is set in such a position and operating, the wavelength control unit W is operated to produce the desired spectrogram over the first short-wavelength range, extending from about $0.2\mu$ to about $0.35\mu$. Then switch $SW_6$ is opened and $SW_7$ is closed, and the knob 43 is rotated to swing the mirror $M_1$ into position in which radiation from the incandescent lamp $S_2$ is directed along the path 24 into the monochromator 10. While the spectrophotometer is so operating, the wavelength control unit W is operated to scan the spectrum from about $0.35\mu$ to about $0.6\mu$, so as to produce the desired spectrogram in this part of the short-wavelength range. It is to be noted that the order in which the two fragmentary short-wavelength spectrograms are produced by use of radiation emitted from either the hydrogen lamp source $S_1$ or the incandescent source $S_2$ is unimportant, and that these spectrograms may be produced in either order.

Next, to produce a spectrogram in the long-wavelength range, the knobs 45 and 47 are set in their long-wavelength positions. In this position the infrared source $S_3$ is energized and is located at the focal position 52, and the mirror $M_2$ is located to reflect infrared radiation emerging from terminal slit 12 toward the long-wavelength photoelectric detector $P_2$, and the preamplifier $PA_2$ is energized from the power supply $V_1$ but the short-wavelength photoelectric detector $P_1$ is not energized. With the spectrophotometer operating in this condition the wavelength control unit is again operated to cause the spectrum to be swept past the terminal slit 12, thereby producing the desired spectrogram in the long-wavelength region. It is preferable to record the long-wavelength spectrogram last so that the infrared source $S_3$ will have ample time to cool off before the short-wavelength detector $P_1$ is re-energized while the sample is being replaced.

As previously mentioned, the specific photo-electric detector $P_1$ that is employed in the measurement of transmission and absorption characteristics in the short-wavelength range is a 1P28 employing an S5 photoelectric surface. As indicated by the spectral response characteristic represented in graph $G_4$ of Fig. 5, this photoelectric detector is selectively responsive to short-wavelength radiation in the range extending from about $0.2\mu$ to about $0.6\mu$ and it is very insensitive in the range in which the ambient black-body radiation is strong. By employing a photoelectric detector $P_1$, which is insensitive to the ambient infrared radiation, neither the ambient black-body radiation nor the excess of such radiation that strikes the short-wavelength photoelectric detector $P_2$ at the times that the mirror $M_3$ intercepts the projection of radiation from the monochromator 10 to the short-wavelength photoelectric detector $P_1$, produces any significant signal in the output of this detector. For this reason the signals produced at the time that the short-wavelength spectrograms are being produced are free from any errors that might otherwise be produced because of the fact that the temperature of the mirror $M_3$ is above the ambient temperature.

By passing ultraviolet radiation from the short-wavelength sources $S_1$ and $S_2$ through the monochromator prior to passage through the sample, only a narrow band of such energy enters the sample. In this way photochemical effects on the sample are maintained at a minimum.

By passing radiation from the long-wavelength source $S_3$ through the samples to the beam director BD and then through the monochromator 10 to the long-wavelength photoelectric detector $P_2$ only a small portion of the excess infrared radiation originating in the beam director affects the photoelectric detector $P_2$. Thus, a much higher degree of accuracy is obtained in making measurements with this arrangement in the infrared region than could be obtained if the long-wavelength radiation $S_3$ were located in the selector unit 30 and were transmitted through the monochromator before being transmitted through the samples to a photoelectric detector located at the focal position 52. Furthermore, it will be noted from graph $G_2$ of Fig. 4 that very little ultraviolet radiation is emitted from the long-wavelength source $S_3$ so that the transmission of radiation from that source through the samples before entering the monochromator does not cause any excessive photochemical deterioration of the samples. Thus, no excessive exposure of the samples to ultraviolet radiation occurs during the recording of either a short-wavelength spectrogram or a long-wavelength spectrogram.

It is to be noted that the photoelectric cell $P_1$ is not energized by the dynode supply $V_2$ while the long-wavelength source $S_3$ is emitting radiation, the switches $SW_4$ and $SW_5$ being interlocked for this purpose. By so interlocking the circuits which supply power to the long-wavelength source and to the short-wavelength photoelectric detector $P_1$, any drift or changes in sensitivity of the photoelectric detector $P_1$ that would otherwise occur because of long-wavelength radiation falling on the photoelectric detector $P_1$ while it is energized, is prevented.

In the graphs $G_4$ and $G_5$, representing the sensitivity of the two photoelectric devices $P_1$ and $P_2$, account has been taken of the fact that the relative amplification of the preamplifiers $PA_1$ and $PA_2$ are so set that with the spectrophotometer in operation the maximum signals produced at the output of the driver amplifier $A_2$, in both the short-wavelength region and the long-wavelength region, possess the same signal-to-noise ratio of 1000. The manner in which equal signal-to-noise ratio is attained can be understood from the following explanation.

In view of the fact that the widths of the two terminal slits 12 and 16 are equal and are varied together by means of the servo-motor 0, and the intermediate slit 14 is sufficiently wide so as not to affect the intensity of radiation passing through the monochromator, it follows that the intensity that does pass through the monochromator is proportional to the square of the slit width.

With a PbS cell $P_2$, which is of the photoconductive type, the noise produced is constant; that is, it is independent of the intensity being detected. Thus, for the long-wavelength detector $P_2$ the signal-to-noise ratio S/N is proportional to the square of the slit width. But with a 1P28 photoelectric detector, which is of the photoemissive type, and which employs an electron multiplier, the amplitude of the noise increases with the square root of the intensity of the illumination falling thereon. Thus, for the short-wavelength detector $P_1$ the signal-to-noise ratio is proportional to the slit width. The fact that the signal-to-noise ratio for the two detectors varies in a different way with the slit width, and hence with the intensity, makes it possible to set the signal-to-noise ratio appearing at the output of the two preamplifiers $PA_1$ and $PA_2$ at an equal value by manipulation of the gain of one or both of the preamplifiers. In the particular case illustrated, the signal-to-noise ratio was set at 1000, thus assuring equal accuracy in the making of spectrograms in both wavelength regions.

It will be noted that regardless of whether or not the signal-to-noise ratio is the same in the short-wavelength region and the long-wavelength region, nevertheless, because of the action of the servo-mechanism in controlling the slit width, the amplitude of the signal appearing at the output of the driver amplifier $A_2$ corresponding to transmission of signals through the reference sample is substantially constant.

Figure 2:
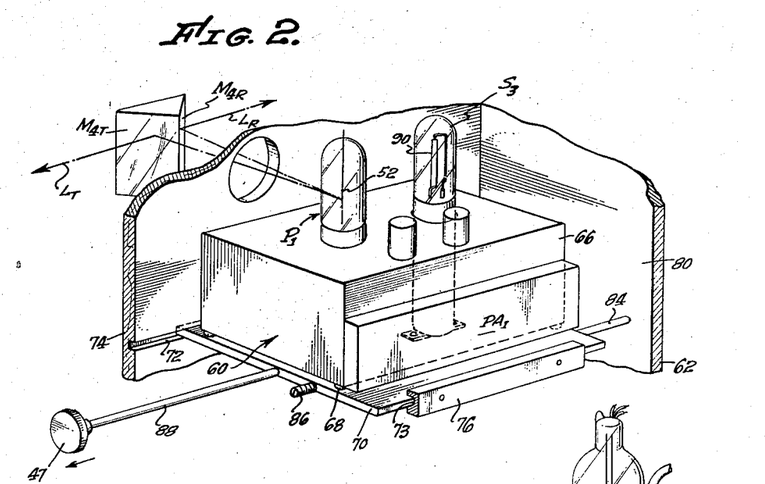
Fig. 2 is a fragmentary isometric view of the mechanism for selectively locating a short-wavelength photoelectric detector and a long-wavelength radiation, source at one end of the spectrophotometer.

In Fig. 2 there are shown some mechanical details of a carriage 60 of the type that is employed in this spectrophotometer. It is to be noted that the carriage 60 comprises a housing 66 which is supported by means of shock-absorbing mountings 68 on a base plate 70 having opposite edges slidable within grooves 72 formed in stationary members 74 and 76 of the testing unit. The photocell $P_1$ is rigidly supported on the housing 66 but the infrared radiating source $S_3$ is solidly connected to the base plate 70 by means of a bracket 76. The preamplifier $PA_1$ consists of a number of elements, such as amplifier tubes, condensers, resistors, and the like, which are suitably mounted upon the housing 66. The rear and front walls 80 and 82 of the comparison unit 50 act as rear and front stops 62 and 64, respectively. The front and rear positions of the carriage 60 are determined in part by the locations of these walls and also in part by means of an adjustable pin 84 extending rearwardly from the carriage 60 and another adjustable threaded pin 86 extending forwardly therefrom. The operating handle 47 is connected at the front end of a shaft 88 extending forwardly from the base plate 70.

The long-wavelength radiation source $S_3$ comprises an elongated ribbon 90 which is mounted with its longitudinal axis vertical, and with its area facing the mirrors $M_{4T}$ and $M_{4R}$ which are employed to deflect portions of the infrared radiation emitted from the source $S_3$ to the test cell $C_T$ and the reference cell $C_R$.

With this arrangement it is clear that each time the carriage 60 is set in either its long-wavelength position or its short-wavelength position, the ribbon 90 of the long-wavelength source $S_3$ and the photosensitive surface of the photocell $P_1$ respectively are brought into proper register with the position 52.

Figure 3:
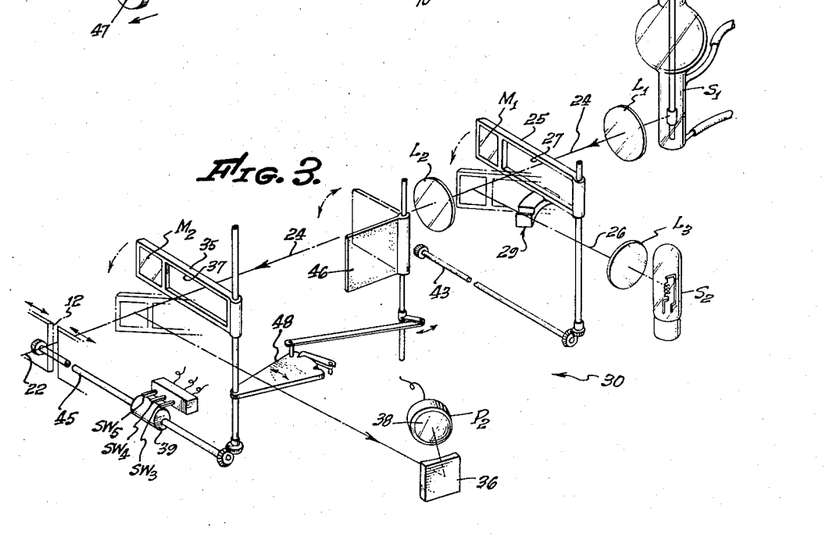
Fig. 3 is an isometric view showing the short-wavelength radiation source and a long-wavelength detector at the other end of the spectrophotometer.

In Fig. 3 there are shown some details of the mechanism which are employed for operating the mirrors $M_1$ and $M_2$ and the switches $SW_3$, $SW_4$ and $SW_5$. Here it will be noted that the first mirror $M_1$ is mounted at the end of a frame 25, which includes a window 27. This frame is rotatable by manipulation of the control knob 43 between a first position in which the light path 24 extends through the window 27 and a second position in which the mirror $M_1$ intercepts the light path at an angle of 45°, as previously explained. A locking device 29 having suitable detents is employed to lock the frame in one or the other of these two positions. In the first position radiation from the hydrogen lamp $S_1$ passes through the window 27 toward the monochromator 10 along the light path 24. In the second position, radiation from the incandescent lamp $S_2$ is reflected by the mirror $M_1$ along the light path 24 toward the monochromator 10. It is to be noted that the two lamps $S_1$ and $S_2$ are of such a design that they radiate energy from elongated parts thereof which are arranged vertically and parallel to the terminal slit 12 through which their radiation is to be projected. In effect these two lamps may be considered a single short-wavelength source.

In a similar manner the mirror $M_2$ is mounted at the outer end of a frame 35 having a window 37. This frame is movable from a first position in which it is perpendicular to the light path 24 and a second position in which the mirror $M_2$ intercepts the light path 24 at an angle of 45°. In the first position radiation from either the source $S_1$ or the source $S_2$ that is traveling along the light path 24 passes through the window 37 toward the monochromator 10. In the latter position radiation from the monochromator is reflected by the mirror $M_2$ to the concave mirror 36 and thence to the photoelectric cell $P_2$. A cam 39, or other suitable means, operated by the control knob 45, is employed to set the switches $SW_3$, $SW_4$ and $SW_5$ in either the first position or the second position, as the case may be, so that power from the sources $V_1$, $V_2$ and $V_3$ shall be applied to the spectrophotometer in the manner previously described hereinabove.

An opaque mask 46 is arranged to be operated so that it is withdrawn from the light path 24 when the control knob 45 is set in its short-wavelength position, and so that it intersects the light path 24 when the control knob 45 is set in its long-wavelength position. The mechanism for accomplishing this result consists of a suitable linkage 48 interconnecting the shafts upon which the frame 35 and the mask 46 are mounted.

The mask 46 does not in any way interfere with the transmission of short-wavelength radiation from either source $S_1$ or $S_2$ to the monochromator 10 when short-wavelength spectrograms are being recorded. However, when a long-wavelength spectrogram is being recorded by emission of radiation from the long-wavelength source $S_3$ and detection of such radiation by the long-wavelength photoelectric detector $P_2$ the mask 46 reduces the amount of infrared radiation that is being emitted by either of the short-wavelength lamps $S_1$ or $S_2$ from reaching the photoelectric detector $P_2$ by scattering from the walls and the mirror $M_2$. Thus, by employing a mask 46 to intercept the optical path 24 between the sources $S_1$ and $S_2$ and the mirror $M_2$ during the recording of the long-wavelength spectrogram, spurious signals due to the scattering of long-wavelength radiation to the photoelectric detector $P_2$ is reduced. This is particularly important where the control unit $U_1$ is of such design that pulses of energy are emitted from the hydrogen lamp $S_1$ each time radiation is to be transmitted along one of the paths $L_R$ and $L_T$. Such an arrangement is especially useful when a beam chopper is employed, as by energizing the lamp only when the chopper permits the passage of light along the path $L_R$ or $L_T$, the source $S_1$ may be operated at higher intensity. Such an arrangement may include, for example, a synchronizing connection (not shown) between a chopper in the beam deflector and a relay in the control unit $U_1$.

It is apparent from the foregoing description that an improved flicker-beam spectrophotometer employing a shutter driven by a motor has been provided for determining the transmission and absorption characteristics of a specimen over a wide wavelength range including short-wavelengths which might cause deterioration of the sample under investigation and also including long-wavelengths in the ambient black-body wavelength region. This improvement is brought about by directing the short-wavelength radiation through the monochromator and through the comparison unit in one direction, and the long-wavelength radiation therethrough in the opposite direction. Furthermore, the advantages of this system are obtained without the danger of infrared radiation from the short-wavelength sources seriously disturbing the measurements made by means of a long-wavelength photoelectric detector that is located at the same end of the monochromator as the short-wavelength source.

In the specific embodiment of the invention described herein, the beam deflector operates to alternate the transmission of radiation along the test path $L_T$ and the reference path $L_R$, and a comparison is made of the amplitudes of the pulses of radiation alternately transmitted along those two paths. It will be understood, however, that the invention is also applicable to a system in which measurements are made of the intensity of radiation that is periodically transmitted only along one of the paths. Thus, the beam deflector that causes the periodic transmission of radiation along the path through the sample under investigation may act merely as a chopper as it does when radiation is transmitted along the reference path $L_R$ or it may act merely as a mirror as it does when radiation is transmitted along the test path $L_T$.

If the beam interrupter or deflector is acting merely as a chopper, then infrared radiation is periodically emitted from the back side of the chopper toward the photoelectric device $P_1$. If the back side is coated with black paint or other light-absorbing coating, it acts substantially as a black body, therefore producing a differential emission of energy corresponding to the graph $G_6$. The radiation thus produced periodically in excess over that which would otherwise be transmitted to the photoelectric detector from the jaws of the terminal slit 16 would cause a substantial spurious effect.

On the other hand, if the beam deflector is merely acting as a mirror, as it does when radiation is periodically transmitted along the test path $L_T$, the spurious effect is due to the excess of radiation being transmitted to the focal position 52 from the reflecting surface of the mirror compared with the amount of radiation that would be transmitted thereto from the walls of the monochromator. In case the mirror has a high reflection coefficient, such as 95%, the amount of radiation emitted is considerably lower than it would be if the mirror were a black body. Nevertheless, the integrated effect is still so large as to cause a spurious signal which would introduce serious inaccuracies in the measurements.

It is, therefore, to be understood that the invention is applicable to all spectrophotometers of the flicker-beam type. Although only one specific embodiment of the invention has been described herein, it will be obvious that the invention is not limited thereto, but is capable of a variety of mechanical embodiments. It will be understood, for example, that various changes which will now suggest themselves to those skilled in the art may be made in the material, form, details of construction, and arrangement and proportions of the parts of the spectrophotometer without departing from the principles of the invention. For example, the invention is applicable both to dual-beam spectrophotometers of the flicker-beam type in which the intensities of two periodically variable beams are being compared, and to single-beam spectrophotometers in which the intensity of only one periodically variable beam is being measured. In the latter case, the invention applies either to a system in which the periodic interruption of the beam is accomplished by periodic reflection of the beam by means of a mirror or by periodic cutting off of the beam by means of a chopper. As previously indicated, the invention is also applicable to a system in which a chopper, such as one mounted on the mirror shaft, is employed to limit the interval of transmission of radiation from the source to the detectors.

The invention claimed is:

1. In a spectrophotometer, the improvement comprising: a monochromator having first and second slits arranged at first and second positions respectively, a fraction of heterogeneous radiation entering one of said slits emerging as monochromatic radiation from the other slit, said monochromator being adjustable to vary the wavelength of the emerging radiation over a range extending from a short-wavelength region including a part of the ultraviolet region to a long-wavelength region including a part of the infrared region; means establishing a pair of merging branch paths between said second position and a third position; means for supporting a sample on at least one of said branch paths, whereby the amount of any radiation transmitted along said one branch path is altered according to a spectral characteristic of the sample; means including a beam interrupter for alternately transmitting radiation from one of said latter positions to the other latter position along said branch paths, parts of said spectrophotometer having different temperatures being visible at different times at said latter positions during the operation of the beam interrupter, whereby the amount of long-wavelength radiation reaching said latter positions from said parts varies periodically; means including a first photoelectric means responsive only to such short-wavelength radiation; a long-wavelength radiation source adapted to emit radiation rich in such long-wavelength region; means for selectively positioning said first photoelectric means and said long-wavelength radiation source at said third position; a short-wavelength radiation source adapted to emit radiation in such short-wavelength region; means for directing radiation from said short-wavelength radiation source through said first slit into said monochromator, whereby monochromatic short-wavelength radiation intermittently reaches said third position along said branch paths; means including a second photoelectric means responsive to radiation in said long-wavelength region for measuring the intensity of radiation emerging from said first slit, whereby monochromatic long-wavelength radiation intermittently reaches said second photoelectric means after passage along said branch paths; and means for comparing the amplitudes of signals produced by each of said photoelectric means in response to radiation transmitted along the respective branch paths and through said monochromator.

2. In a spectrophotometer, the improvement comprising: a monochromator having first and second slits arranged at first and second positions respectively, a fraction of heterogeneous radiation entering one of said slits along said path emerging as monochromatic radiation from the other slit, said monochromator being adjustable to vary the wavelength of the emerging radiation over a range extending from a short-wavelength region including a part of the ultraviolet region to a long-wavelength region including a part of the infrared region; means for establishing conjugate focal relationships between said second position and a third position along a pair of merging branch paths, whereby radiation emerging at one of said latter positions is concentrated at the other position thereon; means for supporting a sample on at least one of said branch paths, only part of the radiation entering said sample being transmitted therethrough; means including a beam deflector for alternately transmitting radiation from one of said latter positions to the other latter position along said branch paths, parts of said spectrophotometer having different temperatures being visible at different times at said latter positions during the operation of the beam interrupter, whereby the amount of long-wavelength radiation reaching said latter positions from said parts varies periodically; means including a first photoelectric means responsive only to such short-wavelength radiation; a long-wavelength radiation source adapted to emit radiation rich in such long-wavelength region; means for selectively positioning said first photoelectric means and said long-wavelength radiation source at said third position; a short-wavelength radiation source adapted to emit radiation in such short-wavelength region; means for directing radiation from said short-wavelength radiation source through said first slit into said monochromator, whereby monochromatic short-wavelength radiation intermittently reaches said third position along said branch paths; means including a second photoelectric means responsive to radiation in said long-wavelength region for measuring the intensity of radiation emerging from said first slit, whereby monochromatic long-wavelength radiation intermittently reaches said second photoelectric means after passage along said branch paths; and means for comparing the amplitudes of signals produced by each of said photoelectric means in response to radiation transmitted along the respective branch paths and through said monochromator.

3. In a spectrophotometer, the improvement comprising: a monochromator having first and second slits arranged at first and second positions respectively, a fraction of heterogeneous radiation entering one of said slits along said path emerging as monochromatic radiation from the other slit, said monochromator being adjustable to vary the wavelength of the emerging radiation over a range extending from a short-wavelength region including a part of the ultraviolet region to a long-wavelength region including a part of the infrared region; means for supporting a sample to be an analyzed on an external path between said second position and a third position, whereby radiation emerging from one of said latter positions is transmitted to said sample and part of the radiation incident on said sample is transmitted to the other latter position; means including a beam interrupter for periodically intercepting radiation transmitted along said external path to periodically project radiation between said second position to said third position, parts of said spectrophotometer having different temperatures being visible at different times at said latter positions during the operation of the beam interrupter, whereby the amount of long-wavelength radiation reaching said latter positions from said parts varies periodically; a first photoelectric means responsive to such short-wavelength radiation but not to ambient infrared radiation; a long-wavelength radiation source adapted to emit radiation rich in such long-wavelength radiation; means for selectively rendering said first photoelectric means receptive to radiation reaching said third position and said long-wavelength radiation source operative to emit radiation from said third position; a short-wavelength radiation source adapted to emit radiation in such short-wavelength region; means for directing radiation from said short-wavelength radiation source through said first slit into said monochromator, whereby monochromatic short-wavelength radiation intermittently reaches said third position after incidence on said sample; and a second photoelectric means responsive to radiation in said long-wavelength region for receiving radiation emerging from said first slit, whereby monochromatic long-wavelength radiation intermittently reaches said second photoelectric means after incidence on said simple.

4. A spectrophotometer as defined in claim 3 comprising: a carriage for supporting both said first photoelectric means and said long-wavelength radiation source adjacent said third position; means for selectively energizing one or the other of said radiation sources; a power supply for energizing said first photoelectric means; and means for operatively connecting said first photoelectric means to said power supply only when said long-wavelength source is not energized.

5. A spectrophotometer as defined in claim 4 comprising: first and second preamplifiers connected respectively to said first and second photoelectric means; means for rendering said first preamplifier operative to amplify signals produced by said first photoelectric means only when said short-wavelength source is energized; means for rendering said second preamplifier operative to amplify signals produced by said second photoelectric means only when said long-wavelength source is energized; and common means connected to both said preamplifiers for measuring the output of the operative preamplifier.

6. In a spectrophotometer, the improvement comprising: a monochromator having first and second slits arranged at first and second positions respectively, a fraction of heterogeneous radiation entering one of said slits along said path emerging as monochromatic radiation from the other slit, said monochromator being adjustable to vary the wavelength of the emerging radiation over a range extending from a short-wavelength region including a part of the ultraviolet region to a long-wavelength region including a part of the infrared region; means for supporting a sample to be analyzed on a first path external to said monochromator between said second position and a third position, whereby radiation emerging from one of said latter positions is transmitted to said sample and part of the radiation incident on said sample is transmitted to the other latter position; means including a beam interrupter for periodically intercepting radiation transmitted along said first external path, parts of said spectrophotometer having different temperatures being visible at different times at said latter positions during the operation of the beam interrupter, whereby the amount of long-wavelength radiation reaching said latter positions from said parts varies periodically; a first photoelectric means responsive to such short-wavelength radiation but not to ambient infrared radiation; a long-wavelength radiation source adapted to emit radiation rich in such long-wavelength radiation; means for selectively rendering said first photoelectric means receptive to radiation reaching said third position and said long-wavelength radiation source operative to emit radiation from said third position; a short-wavelength radiation source adapted to emit radiation in such short-wavelength radiation; means for directing radiation from said short-wavelength radiation source along a second external path through said first slit into said monochromator, whereby monochromatic short-wavelength radiation intermittently reaches said third position after incidence on said sample; a second photoelectric means responsive to radiation in said long-wavelength region; and means for rendering said second photoelectric means receptive to radiation emerging from said first split.

7. A spectrophotometer as defined in claim 6 comprising: an infrared absorbing element movable between a position withdrawn from said second external path and an operative position between said short-wavelength source and said monochromator for reducing the amount of long-wavelength radiation emitted by said short-wavelength source from reaching said second photoelectric means when the latter is rendered receptive.

8. In a spectrophotometer, the improvement comprising: a monochromator having first and second slits arranged at first and second positions respectively along a principal light path, whereby a fraction of heterogeneous radiation entering one of said slits along said path emerges as monochromatic radiation from the other slit, said monochromator being adjustable to vary the wavelength of the emerging radiation over a range extending from a short-wavelength region including a part of the ultraviolet region to a long-wavelength region including a part of the infrared region; means for supporting a sample to be analyzed on a first path external to said monochromator between said second position and a third position, whereby radiation emerging from one of said latter positions is transmitted to said sample and part of the radiation incident on said sample is transmitted to the other latter position; means including a beam interrupter for periodically intercepting radiation transmitted along said first external path, parts of said spectrophotometer having different temperatures being visible at different times at said latter positions during the operation of the beam interrupter, whereby the amount of long-wavelength radiation reaching said latter positions from said parts varies periodically; a first photoelectric means responsive to such short-wavelength radiation but not to ambient infrared radiation; a long-wavelength radiation source adapted to emit radiation rich in radiation in such long-wavelength region; means for selectively rendering said first photoelectric means receptive to radiation reaching said third position and said long-wavelength radiation source operative to emit radiation from said third position; a short-wavelength radiation source adapted to emit radiation in such short-wavelength region; means for directing radiation from said short-wavelength radiation source along a second external path through said first slit into said monochromator, whereby monochromatic short-wavelength radiation intermittently reaches said third position after incidence on said sample; a second photoelectric means responsive to radiation in said long-wavelength region offset from said second external path; and a mirror movable between a position withdrawn from said second external path and an operative position on said second external path in which radiation emerging from said first slit is deflected to said second light-sensitive means.

9. A spectrophotometer as defined in claim 8 comprising: an infrared-absorbing element movable between a position withdrawn from said second external path and an operative position between said short-wavelength source and said mirror.

10. A spectrophotometer as defined in claim 9 comprising: control means for moving said mirror and said absorbing element into operative positions simultaneously and for withdrawing them from said second external path simultaneously.

11. A spectrophotometer as defined in claim 10 comprising: means operated by said control means for energizing said short-wavelength source only when said mirror and said absorbing element are withdrawn from said second external path and for energizing said long-wavelength source only when said mirror and said absorbing element are in said operative positions.

12. A spectrophotometer as defined in claim 11 comprising: a power supply for energizing said first photoelectric means; and means also operated by said control means for operatively connecting said first photoelectric means to said power supply only when said long-wavelength source is not energized.

References Cited in the file of this patent
UNITED STATES PATENTS

| | | |
|---|---|---|
| 1,999,023 | Sharp et al. | Apr. 23, 1935 |
| 2,462,995 | Ritzmann | Mar. 1, 1949 |
| 2,613,572 | Mathieu | Oct. 14, 1952 |